(12) United States Patent
Murphy

(10) Patent No.: US 7,468,487 B1
(45) Date of Patent: Dec. 23, 2008

(54) SECURABLE WALLPLATE SYSTEM AND METHOD

(75) Inventor: James M. Murphy, Mill Creek, WA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 11/943,762

(22) Filed: Nov. 21, 2007

(51) Int. Cl.
*H02G 3/12* (2006.01)

(52) U.S. Cl. .............................. 174/58; 174/66; 174/53; 174/55; 220/3.6; 248/56

(58) Field of Classification Search .................. 174/66, 174/67, 58, 53, 55, 48, 135; 220/241, 242, 220/3.6, 3.5; 248/56, 906, 343
See application file for complete search history.

(56) References Cited

U.S. PATENT DOCUMENTS

| | | | |
|---|---|---|---|
| 5,221,814 A * | 6/1993 | Colbaugh et al. ............. | 174/66 |
| 6,093,890 A | 7/2000 | Gretz | |
| 6,346,674 B1 | 2/2002 | Gretz | |
| 6,812,405 B1 | 11/2004 | Hull et al. | |
| 6,870,101 B1 | 3/2005 | Hull et al. | |
| 7,112,743 B2 | 9/2006 | Hull et al. | |
| 7,300,025 B2 * | 11/2007 | Korcz ........................ | 248/56 |

OTHER PUBLICATIONS

Pass & Seymour; Network Wiring Connectivity; product legend (catalog); Cover plus N-1 through N-4, no date.
Carlon Lamson & Sessions; Carlon Zip Box Blue Switch and Outlet Boxes; Catalog; Jun. 2006; 20 pages.

* cited by examiner

*Primary Examiner*—Dhiru R Patel
(74) *Attorney, Agent, or Firm*—Davis Wright Tremaine LLP; George C. Rondeau, Jr.; Heather M. Colburn

(57) ABSTRACT

A securable wallplate system couples a wallplate with a wall without need for additional attachment hardware. The wallplate system includes arm members pivotally coupled with a wallplate. For each arm member, the wallplate can include a guide member that allows the arm member to pivotally rotate from a retracted angular orientation during installation of the wallplate system to an extended angular orientation during final engagement with an interior side of the wall. In final position, the arm members engage with the interior side of the room wall while the wallplate engages with an exterior side of the room wall and covers an opening in the wall.

13 Claims, 5 Drawing Sheets

SECURABLE WALLPLATE SYSTEM AND METHOD

BACKGROUND OF THE INVENTION

1. Field of the Invention

The present invention relates generally to the field of wallplates.

2. Description of the Related Art

Conventional wallplates are fashioned to couple with wall boxes, mud rings, or other attachment hardware secured within a wall defined by wallboard or other wall material. Unfortunately, the attachment hardware required in addition to the wallplate itself can add to installation complexity and cost.

BRIEF DESCRIPTION OF THE SEVERAL VIEWS OF THE DRAWING(S)

DETAILED DESCRIPTION OF THE INVENTION

A securable wallplate system and method according to the present invention couples a wallplate with wallboard or other wall material without need for additional attachment hardware such as wall boxes and mud rings. The wallplate system includes two arm members pivotally coupled with a wallplate. For each arm member, the wallplate can include a guide member that allows the arm member to pivotally rotate from a retracted angular orientation during installation of the wallplate system to an extended angular orientation during final engagement with an interior side of a wall. In the retracted angular orientation, the arm member is positioned within a first area bounded by the periphery of the wallplate to be rotatably positionable from the first retracted position to a first extended position to extend beyond the first area.

In final position, the arm members engage with an interior side of a wall while the wallplate engages with an exterior side of the wall and covers an opening in the wall. Wallplate installation involves the arm members being placed in a retracted angular orientation to allow them to pass through the wall opening from the exterior side of the wall. Once the arm members are on the interior side of the wall, they are pivotally rotated into an extended angular orientation to frictionally engage with the interior side of the wall with the wallplate simultaneously frictionally engaging with the exterior side of the wall.

Each of the arm members may include an inclined edge to assist in positioning an engagement portion of the arm member against a portion of the interior side of the wall to frictionally engage the arm member with the wall. A stop may also be included with each arm member to contact an edge of the associated guide member of the wallplate to properly position the arm member in the extended angular orientation for engagement of the arm member with the interior side of the wall.

Figure 1:
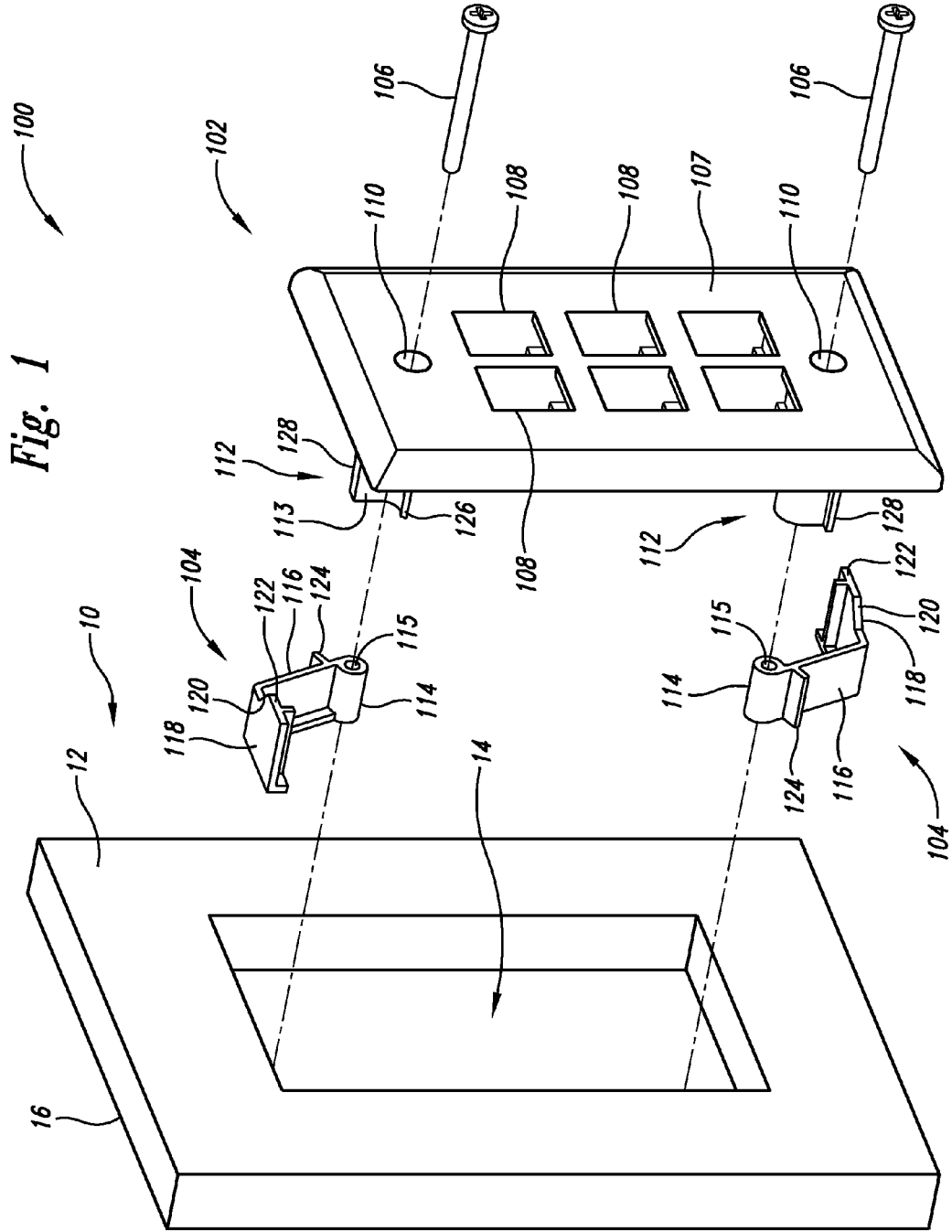
FIG. 1 is a front exploded perspective view of a securable wallplate system according to the present invention positioned for mounting into an opening of a wall.

Facing a wall 10 having an exterior side 12 bounding a room and an aperture 14 therethrough, an implementation of a wallplate system 100 is shown in FIG. 1 as having a wallplate 102 with two arm members 104, each with a screw 106 to rotatably couple the arm member with the wallplate. The wallplate 102 is shown having a forward or exterior side 107 with receptacle apertures 108 to retain connectors (not shown). The wallplate 102 includes two apertures 110, each to receive one of the screws 106, and further includes two guide members 112, each with an interior trough 113 to receive a cylindrical portion 114 of one of the arm members 104. With the cylindrical portion 114 positioned in the interior trough 113 of the guide member 112, the arm member 104 is able to rotate about an axis substantially perpendicular to the wallplate 102 and coincident with the longitudinal axes of the interior trough 113 and the screw 116.

The cylindrical portion 114 of each of the arm members 104 has a threaded aperture 115 therethrough to receive one of the screws 106 for rotatably coupling the arm member with the wallplate 102 and allowing selective rotation of the arm member upon turning of the screw. Extending laterally from the cylindrical portion 114 is an elongated portion 116 with an engagement portion 118 extending therefrom. The engagement portion 118 has an inclined edge 120 that transitions to an engagement edge 122 on a side of the engagement portion toward a rearward or interior side 123 of the wallplate 102. Extending from the elongated portion 116 near the cylindrical portion 114 is a stop 124.

Figure 2:
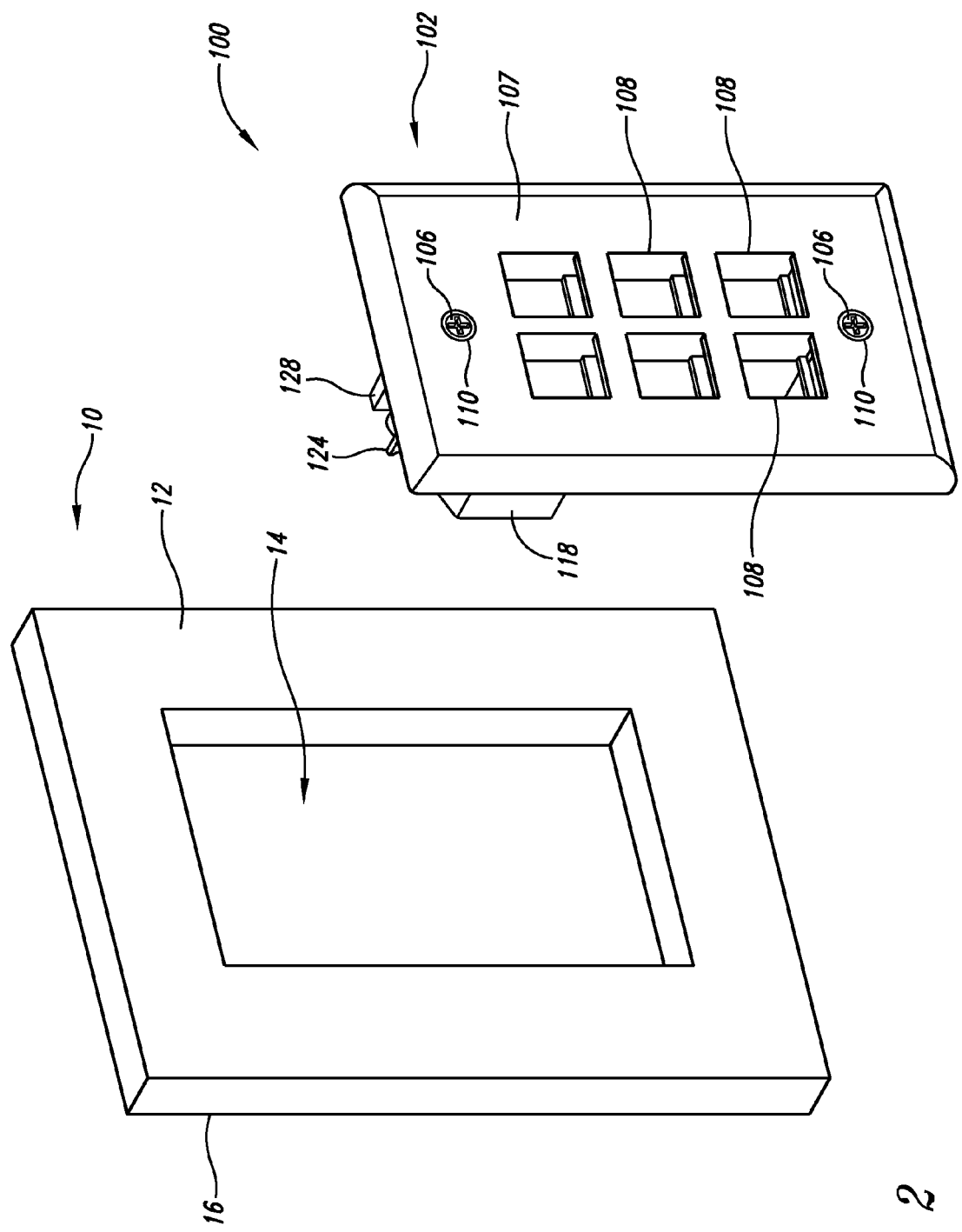
FIG. 2 is a front perspective view of the wallplate system of FIG. 1 with the arm members retracted.
Figure 3:
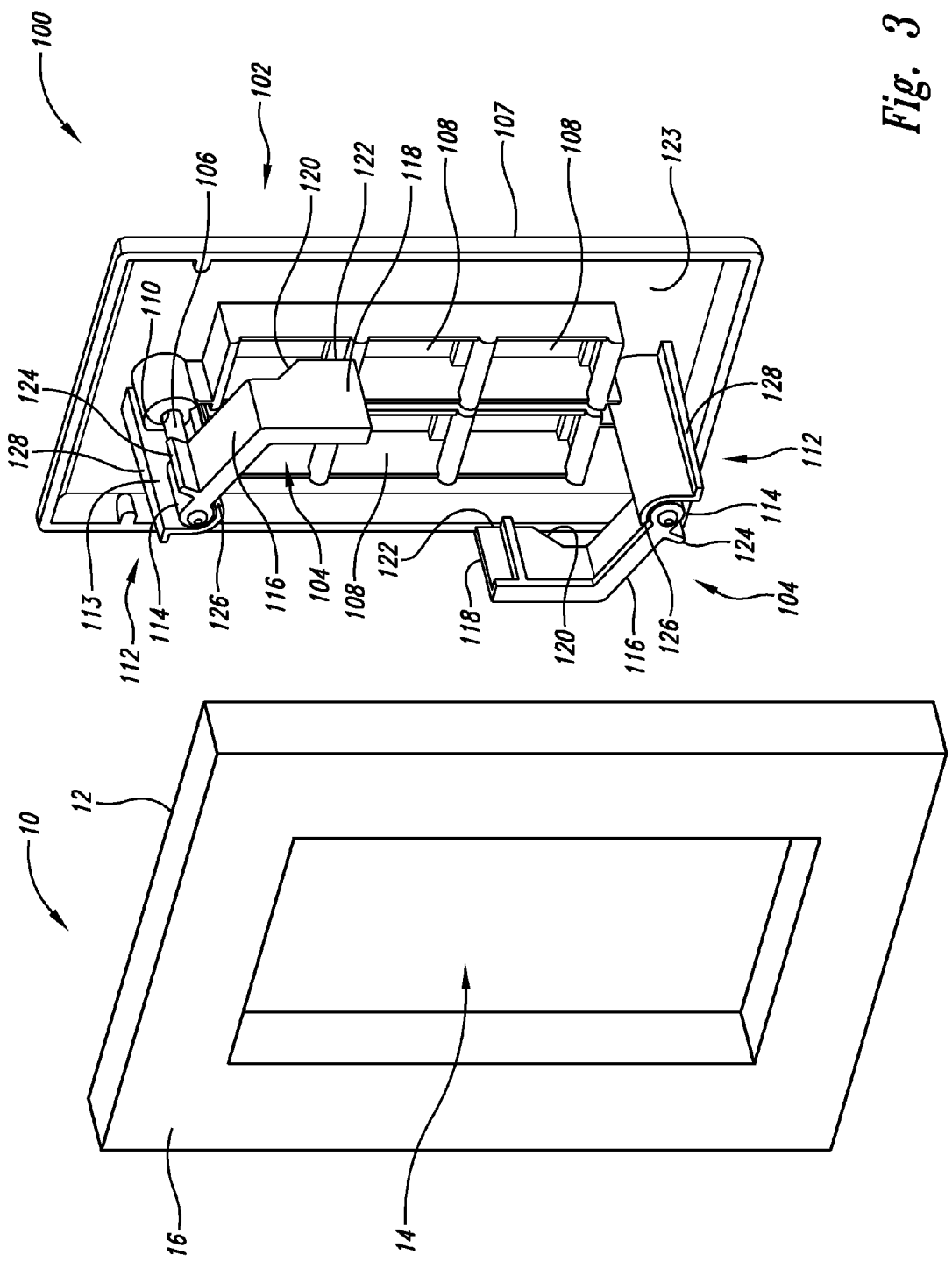
FIG. 3 is a rear perspective view of the wallplate system of FIG. 1 with arm members in a retracted angular orientation.

The system 100 is shown in FIGS. 2 and 3 prior to installation into the wall 10. Each of the arm members 104 is shown in FIG. 3 coupled with the wallplate 102 with the cylindrical portion 114 of the arm member positioned in the interior trough 113 of one of the guide members 112. The arm members 104 are shown in a retracted position to allow the arm members to be inserted through the aperture 14 of the wall 10 during installation of the system 100. In the retracted position, the screws 106 have been sufficiently rotated to cause the elongated portion 116 of the arm member 104 to contact a first stop portion 126 of the guide member 112.

Figure 4:
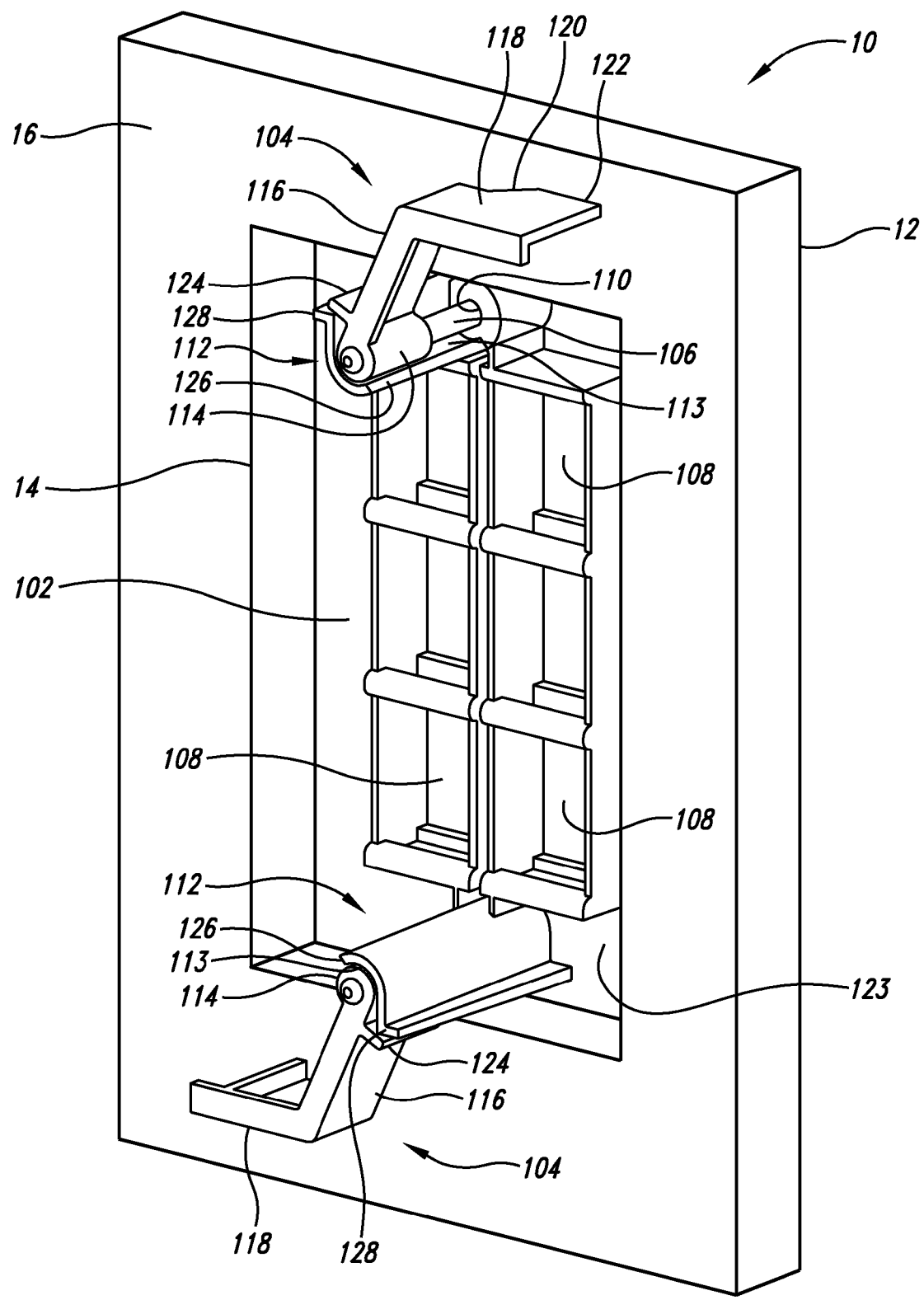
FIG. 4 is a rear perspective view of the wallplate system of FIG. 1 shown as positioned through an opening of a wall with the arm members in an extended angular orientation to couple the wallplate with the wall.
Figure 5:
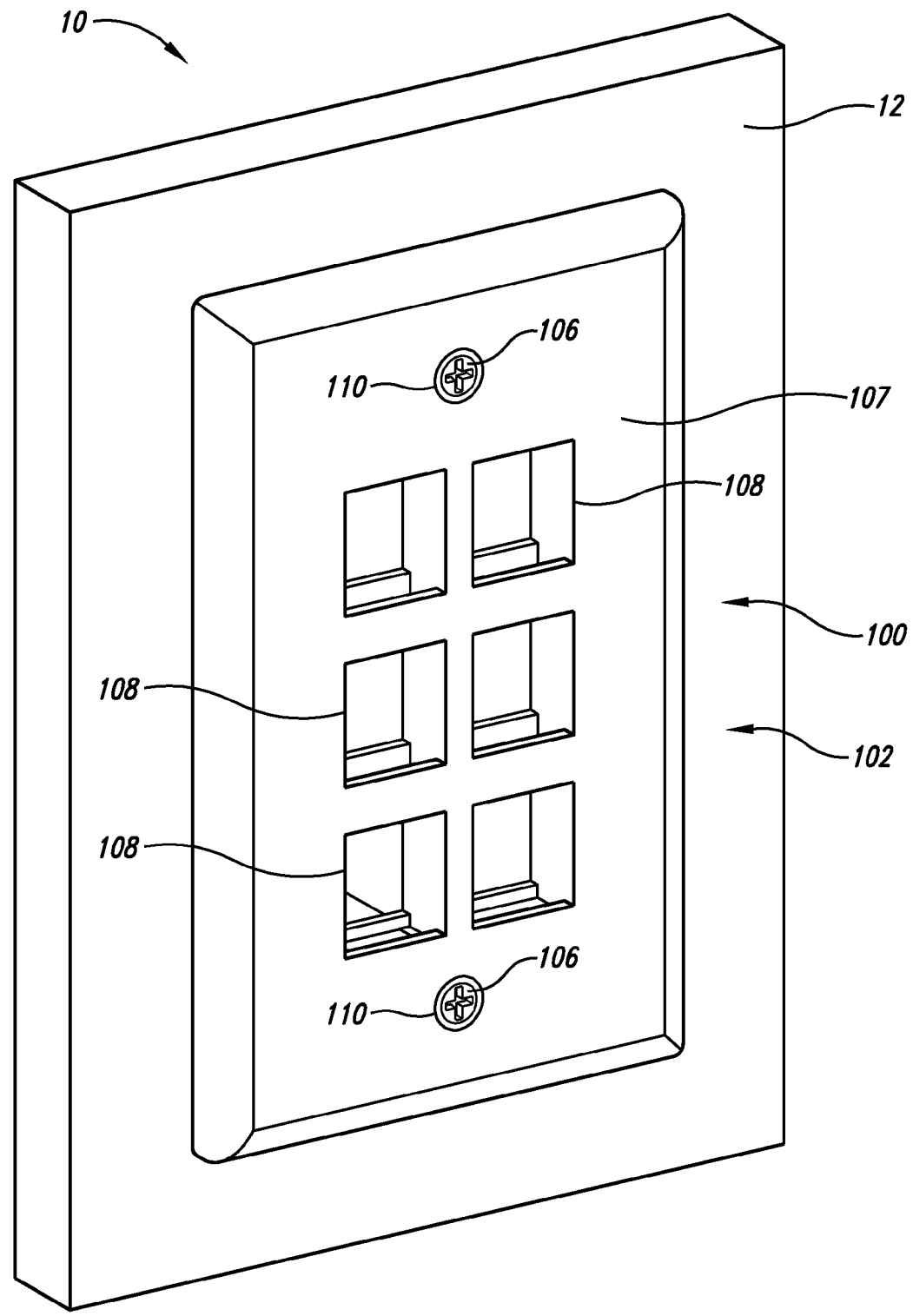
FIG. 5 is a front perspective view of the wallplate system of FIG. 1 shown coupled with the wall.

The system 100 is shown in FIG. 4 with each of the arm members 104 having the engagement edge 122 of the engagement portion 118 in frictional contact with an interior side 16 of the wall 10 and the wallplate 102 in frictional contact with the exterior side 12 of the wall to secure the system with the wall. The arm members 104 have been pivoted from the retracted position shown in FIG. 3 to an extended position shown in FIG. 4 with the stop 124 of each of the arm members 104 contacting a second stop portion 128 of the respective guide member 112. When each of the arm members 104 is rotated from the retracted position to the extended position, the inclined edge 120 serves as a ramp to progressively apply a clamping force on the wall until the engagement edge 122 is positioned against the interior side 16 of the wall 10 and the interior side 123 of the wall plate 102 is pulled tightly against the exterior side 12 of the wall. The inclined edge 120 allows this to be accomplished without the arm member 104 getting stuck or otherwise bound. The system 100 is shown in FIG. 5 engaged with the wall 10 with the wallplate 102 covering the aperture 14 in the wall.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to an implementation, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any other embodiments, adaptations, variations, modifications and equivalent arrangements, the present invention being limited only by the claims appended hereto and the equivalents thereof.

The invention claimed is:

1. For a wall having an interior side, an exterior side, and an aperture therethrough, a system comprising:
   a wallplate having a periphery, a forward side and a rearward side;
   a first arm member positioned at the rearward side of the wallplate, the first arm member comprising a cylindrical portion, an elongated portion extending from the cylindrical portion, and an engagement portion extending from the elongated portion, the engagement portion having an engagement edge, the first arm member being rotatably coupled to the wallplate by the cylindrical portion to pivot about an axis relative to the wallplate, the first arm member being rotatably positionable in a first retracted position within a first area bounded by the periphery of the wallplate and rotatably positionable from the first retracted position to a first extended position to extend beyond the first area; and
   a second arm member positioned at the rearward side of the wallplate, the second arm member comprising a cylindrical portion, an elongated portion extending from the cylindrical portion, and an engagement portion extending from the elongated portion, the engagement portion having an engagement edge, the second arm member being rotatably coupled to the wallplate by the cylindrical portion to pivot about an axis relative to the wallplate, the second arm member rotatably positionable in a second retracted position within the first area and rotatably positionable from the second retracted position to a second extended position to extend beyond the first area,
   the first arm member in the first retracted position and the second arm member in the second retracted position being positioned to pass through the wall aperture to place the rearward side of the wallplate against the exterior side of the wall,
   the first arm member in the first extended position positioning the engagement edge of the engagement portion of the first arm member to contact the interior side of the wall for frictional engagement of the first arm member with the interior side of the wall, the second arm member in the second extended position positioning the engagement edge of the engagement portion of the second arm member to contact the interior side of the wall for frictional engagement of the second arm member with the interior side of the wall, and the wallplate being positioned to frictionally engage the exterior side of the wall when the first arm member is in the first extended position and the second arm member is in the second extended position.

2. The system of claim 1 wherein the wallplate includes a first guide member with a trough to rotatably receive the cylindrical portion of the first arm member and a second guide member with a trough to rotatably receive the cylindrical portion of the second arm member.

3. The system of claim 2 wherein the first arm member includes a stop positioned to contact the first guide member when the first arm member is in the first extended position and the second arm member includes a stop positioned to contact the second guide member when the second arm member is in the second extended position.

4. The system of claim 1 wherein the engagement portion of the first arm member has an inclined edge adjacent the engagement edge to engage the wall prior to the engagement edge as the first arm member is rotated toward the first extended position, and the engagement portion of the second arm member has an inclined edge adjacent the engagement edge to engage the wall prior to the engagement edge as the second arm member is rotated toward the second extended position.

5. For a wall having an interior side, an exterior side, and an aperture therethrough, a system comprising:
   a wallplate;
   a first member comprising a first cylindrical portion rotatably coupled to the wallplate, a first elongated portion extending from the first cylindrical portion, and a first engagement portion extending from the first elongated portion, the first engagement portion having a first engagement surface, the first member being positionable in a first retracted position within an area and being selectively movable from the first retracted position to a first extended position to extending beyond the area; and
   a second member comprising a second cylindrical portion rotatably coupled to the wallplate, a second elongated portion extending from the second cylindrical portion, and a second engagement portion extending from the second elongated portion, the second engagement portion having a second engagement surface, the second member being positionable in a second retracted position within the area and being selectively movable from the second retracted position to a second extended position to extending beyond the area,
   the first member in the first retracted position and the second member in the second retracted position positioned to pass through the wall aperture,
   the first member in the first extended position and the second member in the second extended position being positioned to frictionally engage the interior side of the wall with the wallplate frictionally engaging the exterior side of the wall, the first engagement surface contacting the interior side of the wall for frictional engagement of the first member with the wall, and the second engagement surface contacting the interior side of the wall for frictional engagement of the second member with the wall.

6. The system of claim 5 wherein the wallplate includes a first guide member with a trough to rotatably receive the cylindrical portion of the first member and a second guide member with a trough to rotatably receive the cylindrical portion of the second member.

7. The system of claim 6 wherein the first member includes a stop positioned to contact the first guide member when the first member is in the first extended position and the second member includes a stop positioned to contact the second guide member when the second member is in the second extended position.

8. The system of claim 5 wherein the engagement portion of the first member has an inclined surface adjacent the engagement edge to engage the wall prior to the engagement surfaces as the first arm member is rotated toward the first extended position, and the engagement portion of the second member has an inclined surface adjacent the engagement edge to engage the wall prior to the engagement surface as the second arm member is rotated toward the second extended position.

9. For a wall having an interior side, an exterior side, and an aperture therethrough, a system comprising:
   a wallplate having a periphery; and
   a member coupled to the wallplate, the member including a cylindrical portion to rotatably couple to the wallplate, an elongated portion extending from the cylindrical portion of the member, and an engagement portion extending from the elongated portion, the engagement portion having an engagement surface, the member being selectively positionable to extend beyond an area bounded by the periphery of the wallplate to position the engagement surface to contact the interior side of the wall for frictional engagement of the member with the interior side of the wall with the wallplate frictionally engaging the exterior side of the wall.

10. The system of claim 9 wherein the cylindrical portion rotatably couples to the wallplate through a screw means.

11. The system of claim 9 wherein the wallplate includes a guide member with a trough to rotatably receive the cylindrical portion of the member.

12. The system of claim 11 wherein the member includes a stop positioned to contact the guide member when the member is positioned to extend beyond the area in position to frictionally engage the interior side of the wall.

13. The system of claim 9 wherein the engagement portion of the member has an inclined surface adjacent the engagement edge to engage the wall prior to the engagement surface as the member is rotated toward the position in frictional engagement with the wall.

* * * * *